United States Patent
Loponen et al.

(10) Patent No.: US 12,484,495 B2
(45) Date of Patent: Dec. 2, 2025

(54) METHOD IN CONTROL OF FOREST MACHINE AND CONTROL ARRANGEMENT

(71) Applicant: Ponsse Oyj, Vieremä (FI)

(72) Inventors: Janne Loponen, Vieremä (FI); Markku Savolainen, Vieremä (FI)

(73) Assignee: Ponsse Oyj, Vieremä (FI)

( * ) Notice: Subject to any disclaimer, the term of this patent is extended or adjusted under 35 U.S.C. 154(b) by 175 days.

(21) Appl. No.: 18/555,173

(22) PCT Filed: Apr. 12, 2022

(86) PCT No.: PCT/FI2022/050242
§ 371 (c)(1),
(2) Date: Oct. 12, 2023

(87) PCT Pub. No.: WO2022/219242
PCT Pub. Date: Oct. 20, 2022

(65) Prior Publication Data
US 2024/0188513 A1 Jun. 13, 2024

(30) Foreign Application Priority Data

Apr. 16, 2021 (FI) ...................................... 20215448

(51) Int. Cl.
*A01G 23/00* (2006.01)
*A01G 23/083* (2006.01)
*F16P 3/14* (2006.01)

(52) U.S. Cl.
CPC ......... *A01G 23/083* (2013.01); *A01G 23/003* (2013.01); *F16P 3/141* (2013.01); *F16P 3/147* (2013.01)

(58) Field of Classification Search
CPC ..... A01G 23/083; A01G 23/003; F16P 3/141; F16P 3/147
(Continued)

(56) References Cited

U.S. PATENT DOCUMENTS

| | | |
|---|---|---|
| 4,913,551 A | 4/1990 | Davis |
| 2016/0054739 A1* | 2/2016 | Palmroth .............. E02F 3/4135 701/50 |

(Continued)

FOREIGN PATENT DOCUMENTS

| | | |
|---|---|---|
| EP | 3594417 A1 | 1/2020 |
| EP | 3760793 A1 | 1/2021 |

(Continued)

OTHER PUBLICATIONS

International Search Report for PCT/FI2022/050242 dated Aug. 2, 2022, 5 pages.
(Continued)

*Primary Examiner* — Mahmoud S Ismail
(74) *Attorney, Agent, or Firm* — Nixon & Vanderhye PC

(57) ABSTRACT

In the present arrangement, a forest machine is controlled, which forest machine includes a body (2), a boom (3) in connection with the body (2) and a tool (4) at the end of the boom (3). A sensor (9) arrangement determines in advance the size of utilizable free space (1 1A, 1 1B) starting from the end of the boom (3). This determination includes determining a direction and a length of the free space (11B). The operation of the tool (4) is allowed into the direction and for the length of the utilizable free space (1 1A, 1 1B) determined in advance.

20 Claims, 5 Drawing Sheets

(58) Field of Classification Search
USPC .......................................................... 701/50
See application file for complete search history.

(56) References Cited

U.S. PATENT DOCUMENTS

2020/0199843 A1\* 6/2020 Ono .................... E02F 9/2041
2020/0299935 A1\* 9/2020 Izumikawa .......... E02F 9/2025

FOREIGN PATENT DOCUMENTS

| RU | 2540544 C2 | 2/2015 |
| WO | 2014191013 A1 | 12/2014 |
| WO | 2018130747 A1 | 7/2018 |
| WO | 2021005265 A1 | 1/2021 |

OTHER PUBLICATIONS

Written Opinion of the ISA for PCT/FI2022/050242 dated Aug. 2, 2022, 7 pages.
Search Report for FI U.S. Appl. No. 20/215,448 dated Oct. 14, 2021, 1 page.
Westerberg S., "Virtual Environment-Based Teleoperation of Forestry Machines: Designing Future Interaction Methods", Journal of Human-Robot Interaction, 2013, pp. 84-110.

\* cited by examiner

METHOD IN CONTROL OF FOREST MACHINE AND CONTROL ARRANGEMENT

CROSS-REFERENCE TO RELATED APPLICATIONS

This application is the U.S. national phase of International Application No. PCT/FI2022/050242 filed Apr. 12, 2022 which designated the U.S. and claims priority to FI 20215448 filed Apr. 16, 2021, the entire contents of each of which are hereby incorporated by reference.

BACKGROUND OF THE INVENTION

The invention relates to forest machines and particularly to their control.

Generally, forest machines must work reliably, efficiently and in a versatile manner. Forest machines and their operation should not also cause risks nor damage to e.g. remaining trees, harvested trees, the machine itself or other objects in the vicinity of the machine.

BRIEF DESCRIPTION OF THE INVENTION

It is therefore an object of the invention to develop a novel type of solution for the control of a forest machine. The arrangement according to the invention is characterised by what is disclosed in the independent claims. Some embodiments of the invention are disclosed in the dependent claims.

In the present arrangement, a forest machine is controlled, which forest machine includes a body, a boom in connection with the body and a tool at the end of the boom. A sensor arrangement determines in advance the size of utilisable free space starting from the end of the boom. This determination consists of determining a direction and a length of the free space. The operation of the tool is allowed into the direction and for the length of the utilisable free space determined in advance. Such an arrangement helps to avoid impacts caused by using the tool. For example, it is possible to avoid damage to external objects, such as standing trees. Similarly, no risks are caused to persons or vehicles in the vicinity. Furthermore, damage to the forest machine, its tool and trees handled is avoided. A safe space is ensured in advance for the tool to operate. The control of the tool is further implemented in a smooth, simple and reliable way. By means of the present arrangement, the operation of the tool of the forest machine can be enhanced to be quicker, safer and more reliable. Instead of first giving the tool an instruction to operate into a certain direction and then checking if there is free space, now the direction and length of the free space is determined in advance, and when the command to operate into the direction and for the length of the free space is given, the command can be realised without delays caused by inspecting safe operation but still in a safe manner.

The forest machine can be e.g. a harvester, a forwarder, a drive machine or a combination of a forwarder and a harvester etc.

The tool can be e.g. a harvester head or a grab. The operation of the tool can comprise cutting and felling of trees, pruning of trees, feeding trees in their longitudinal direction in the tool and/or moving the tool by moving the boom end. In connection with pruning, a tree trunk is typically fed in the longitudinal direction in the harvester head. It is also possible to feed a tree trunk without pruning it e.g. when the tree has already been pruned or the tree is e.g. a pine tree only having branches at its top. When moving the tool, the tool can include e.g. a tree trunk grabbed by the tool.

The sensor arrangement can comprise one or more of the following: a lidar, a camera, a radar, a thermographic camera, un ultrasonic sensor. Furthermore, the sensor arrangement can comprise utilising a positioning arrangement and a map system. Then, it is possible e.g. to position the boom end by precision positioning and to determine the utilisable free space by the map system. Additionally, the sensor arrangement can include a beacon and the observable object(s) can include a device which communicates with the beacon e.g. by using Bluetooth. Then, the position of the device and thus the position of the observable object is positioned by the device signal.

In addition to the direction and length of the free space, it is also possible to determine its width, if desired, and this especially when lifting a tree trunk by a grabber in the lateral direction.

According to an embodiment, a minimum requirement of free space from the end of the boom is determined for the operation of the tool. If the dimensions of the utilisable free space is at least equal to the minimum requirement, the operation of the tool is allowed for the minimum requirement. Then, the tool can be operated at least for the minimum requirement, that is, the task can be started.

In felling, the minimum requirement is the length of the tree determined e.g. by a sensor arrangement, trunk evaluation algorithm or some other way. In pruning, it is possible to feed the trunk only a short distance, if there is only a little free space. Hence, the minimum requirement for pruning can be a part of the trunk length, e.g. less than 50% of the trunk length.

According to an embodiment, a maximum requirement for the operation of the tool is determined in addition to the minimum requirement of free space from the end of the boom. If the size of the utilisable free space is below the maximum requirement, the operation of the tool is at most allowed into the direction and for the length of the utilisable free space. In that case, even if there is no free space available for the maximum requirement, it is still possible to perform the task to some extent. After this, the size of the utilisable free space can be increased e.g. by moving the boom end. Then, the operation of the tool can be allowed into the direction and for the length of the increased utilisable free space. In this way, the whole operation can be performed quickly, safely and flexibly.

For example in pruning, the trunk can be fed to the extent of the free space, even though there is no free space for the size required by the whole trunk. After this, it is possible e.g. to move the boom end and acquire more free space. The feed of the harvester head can continue automatically as soon as more free space comes available. In an embodiment, the butt end of the trunk can then stay in place.

According to an embodiment, the size of the utilisable free space is updated such that, when the distance between the boom end and the object preventing the operation decreases, the size of the utilisable free space is decreased and, when the distance between the boom end and the object preventing the operation increases, the size of the utilisable free space is increased. This is how it is possible to operate in a flexible way and effectively utilise the available free space as much as possible at the given moment.

The object preventing the operation can be one or more of the following: a standing tree, a stone, a vehicle, a building, a person, a power line, the forest machine itself, another forest machine, a work machine or an animal.

The distance between the boom end and the object preventing the operation can decrease or increase when the object is moving, such as a person or a vehicle, and the object moves in relation to the boom end.

The distance between the boom end and the object preventing the operation can decrease or increase when the boom end is moving in relation to the object being in place or moving.

BRIEF DESCRIPTION OF THE DRAWINGS

The invention is now described in closer detail in connection with some embodiments and with reference to the accompanying drawings, in which.

DETAILED DESCRIPTION

Figure 1:
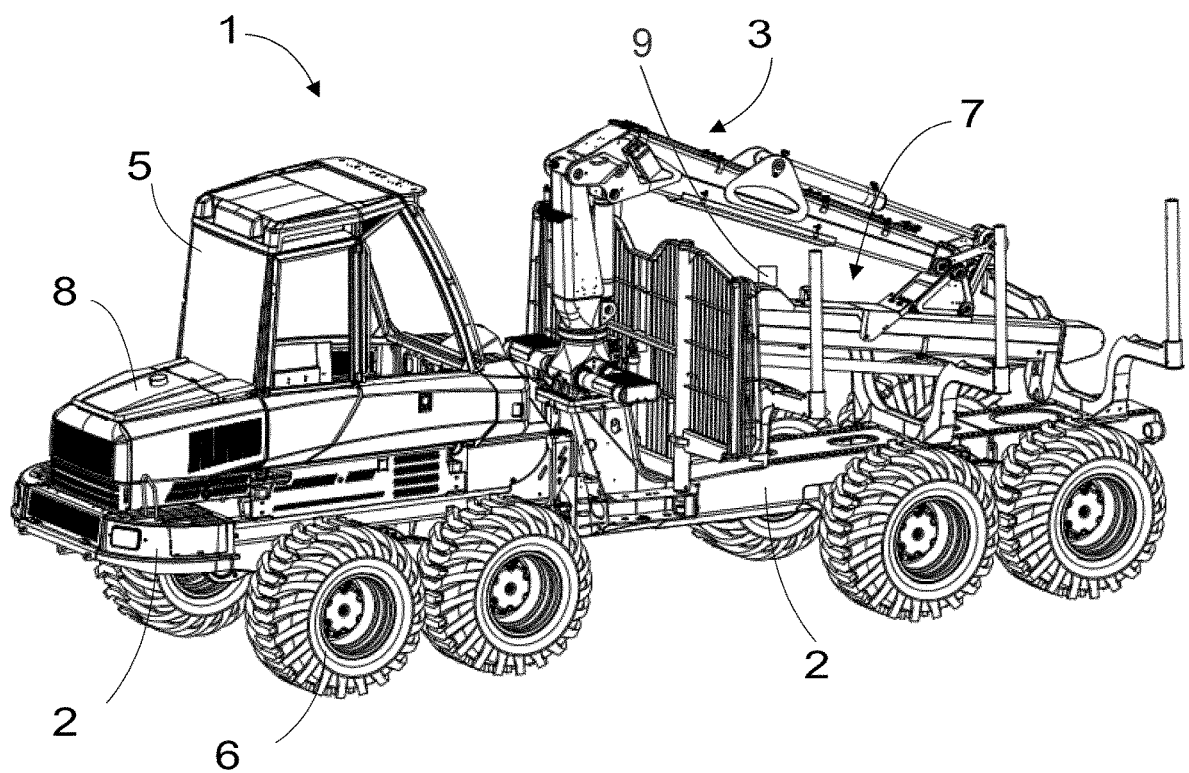
FIG. 1 shows a forest machine.
Figure 2:
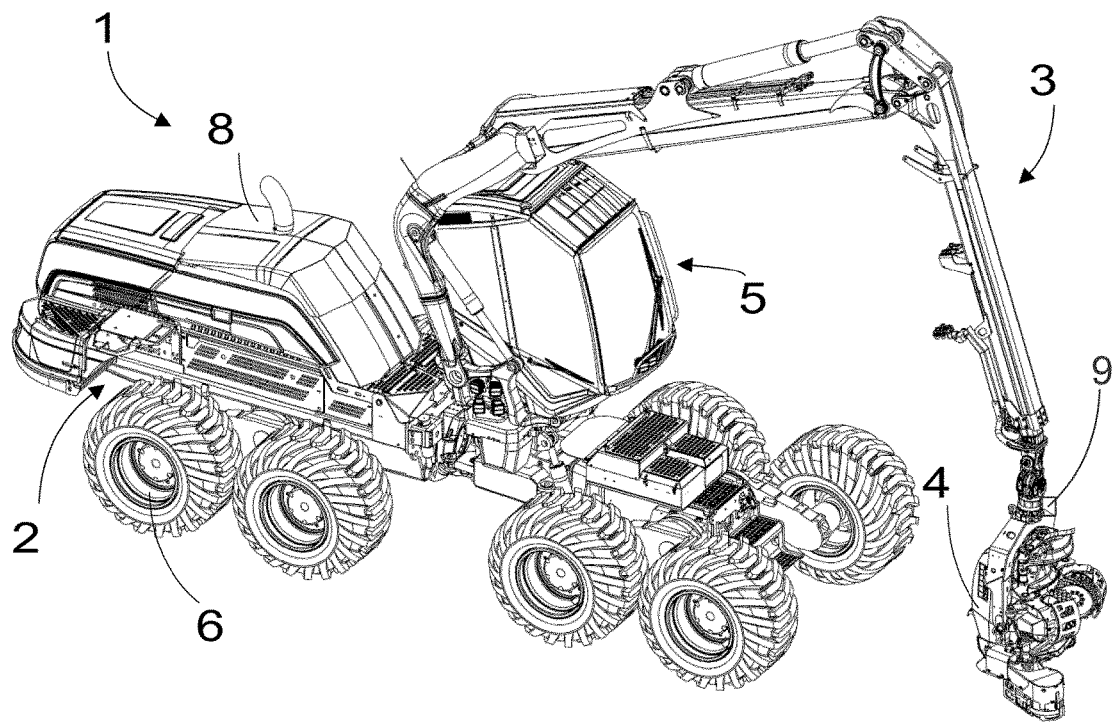
FIG. 2 shows another forest machine.

With reference to FIGS. 1 and 2, FIGS. 1 and 2 show forest machines. A forest machine 1 can be, for example, a forest work unit, such as a forwarder as in FIG. 1, a harvester as in FIG. 2, or some other forest machine, such as a drive machine of another type suitable for carrying a load, or a combination of a forwarder and a harvester.

A body 2 of the working machine 1 can comprise one or more body parts and a boom 3 arranged to at least one body part. In this description, the term boom 3 is also used to refer to boom structures comprising more than one boom.

The forest machine 1 also comprises a tool 4 arranged to the boom 3.

The tool can comprise, for example, a hoisting member, such as a load bucket or a grab, and/or a tree handling tool, such as a harvester head. The forest machine 1 can be body-steered and the forest machine 1 can comprise at least two body parts.

Depending on the embodiment, the forest machine 1 can also comprise other structural elements. For example, the forest machine 1 can comprise a control cabin 5 arranged to at least one body part. The forest machine 1 can further comprise moving means 13, which moving means 6 can comprise at least one of the following: wheels arranged on an axle, wheels arranged on a swinging axle, wheels arranged on a tandem axle, a track system or some other means known as such to control the forest machine to move in relation to its working surface. It will be obvious for a person skilled in the art that the forest machine 1 can also typically comprise numerous additional structural and functional structure parts and entities depending on the type of the forest machine 1, such as a load space 7, a power source 8 and so forth.

The forest machine 1 can include a sensor 9 which operates as a sensor arrangement which is used to determine the size of utilisable free space starting from the end of the boom 3. The sensor 9 can be one or more of the following, for instance: a lidar, a camera, a radar, a thermographic camera, an ultrasonic sensor. The sensor 9 can be arranged to the boom 3 as in FIG. 1. The sensor 9 can be e.g. at the end of the boom 3. Furthermore, the sensor 9 can be arranged e.g. into the tool 4, as illustrated in FIG. 2. In the forest machine 1, it is also possible to arrange the sensor 9 in some other suitable place.

The sensor 9 can both locate the end of the boom 3 and determine the utilisable free space. Additionally, it is possible that other sensors and the control system of the forest machine 1 locate the position of the boom 3 and the sensor 9 determines the utilisable free space. Then, the control systems combines data from different sensors or detectors and determines the size of the utilisable free space starting from the end of the boom 3.

The sensor arrangement for determining the size of utilisable free space starting from the end of the boom 3 can also be implemented without the sensor 9. In that case, the sensor arrangement can comprise utilising a positioning arrangement and a map system. Then, it is possible e.g. to position the end of the boom 3 by precision positioning and to determine the utilisable free space by the map system.

Both the sensor 9 and the map system can observe and locate fixed ones from the objects 12 preventing the operation, such as trees, stones, buildings and power lines. The sensor 9 can also observe and locate moving ones from the objects 12 preventing the operation, such as vehicles, persons, work machines or animals.

Figure 3:
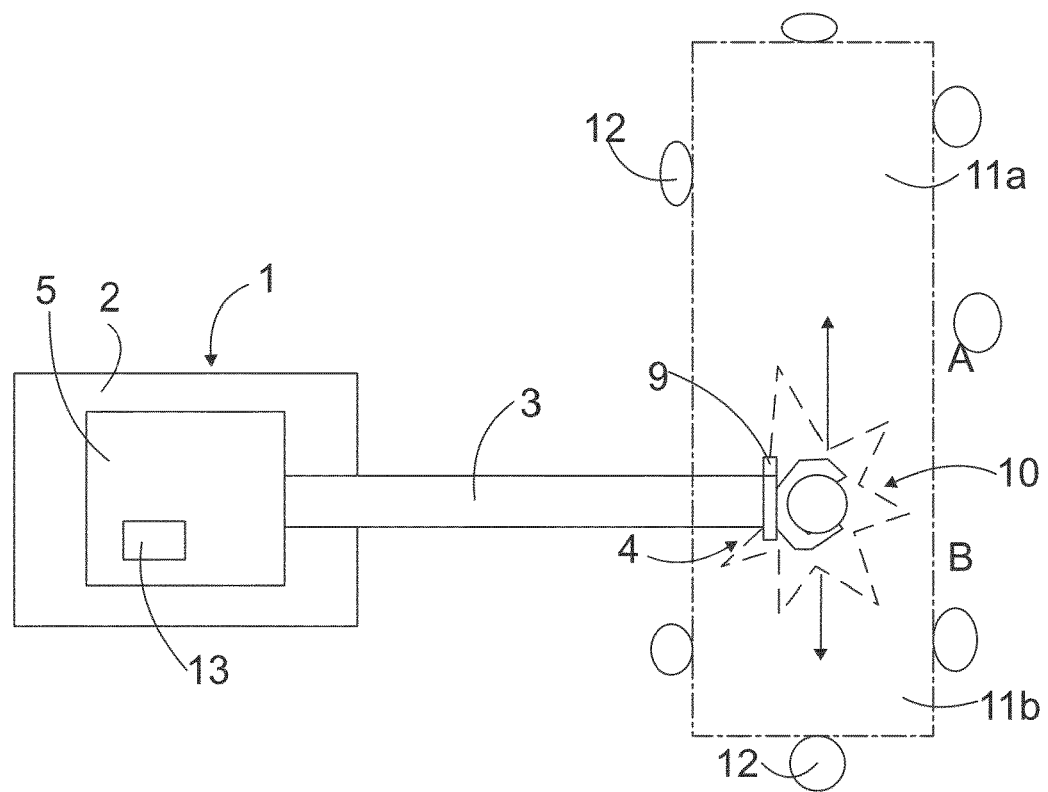
FIG. 3 show a top view of a forest machine before felling.

FIG. 3 shows a situation in which the harvester head of the forest machine 1 has grabbed the butt end of a trunk 10a of a tree 10 before the start of felling. The sensor arrangement determines that there is utilisable free space 11a in direction A and utilisable free space 11b in direction B.

The length of the tree 10 is determined e.g. by a sensor arrangement, a trunk evaluation algorithm or some other way. The length of the tree 10 determines the minimum requirement for the length of the utilisable free space. The length of the utilisable free space 11b in direction B is smaller than the minimum requirement, whereby the felling of the tree 10 into direction B is prevented or the operator of the forest machine is at least given a notification on there not being enough utilisable free space in direction B. Instead, the length of the utilisable free space 11a in direction A at least equals the minimum requirement. Thus, the forest machine 1 is allowed to fell the tree 10 into direction A, which is the situation shown by FIG. 4.

If there is not enough utilisable free space in any direction, it is possible to prevent the felling of the tree by the forest machine 1 and a notification of the situation is given to the operator of the forest machine 1. Then, it is possible to allow the operator of the forest machine 1 to give a command to override the prevention of operation and go ahead and fell the tree. The operator of the forest machine 1 is at least given a notification on the size of the utilisable free space not being sufficient, even though not preventing the operation of the tool 4.

An option is to increase the size of utilisable free space. This can occur e.g. by moving the object(s) 12 preventing the operation or by them moving themselves. On the other hand, the size of the utilisable free space can also be increased by moving the end of the boom 3. In connection with felling a tree, this can mean the felling of another tree. This tree can be the object 12 preventing the felling of the previous tree, whereby it is possible to resume the felling of the previous tree.

After felling the tree 10, branches 10b are pruned from the trunk 10a. In pruning, the minimum requirement for the length of the utilisable free space is not typically the length of the tree 10, but it is possible to prune a certain shorter distance of the trunk 10*a*. Hence, the pruning can be performed such that the trunk 10*a* is fed by the harvester head into utilisable free space 11*b* in direction B.

The maximum requirement of pruning can in some cases be almost the length of the trunk 10*a*. However, the size of the utilisable free space does not have to equal this maximum requirement. If the utilisable free space is smaller than the maximum requirement, the operation of the tool is at most allowed into the direction and for the length of the utilisable free space. This has been done before ending up in the situation shown in FIG. 5.

Figure 5:
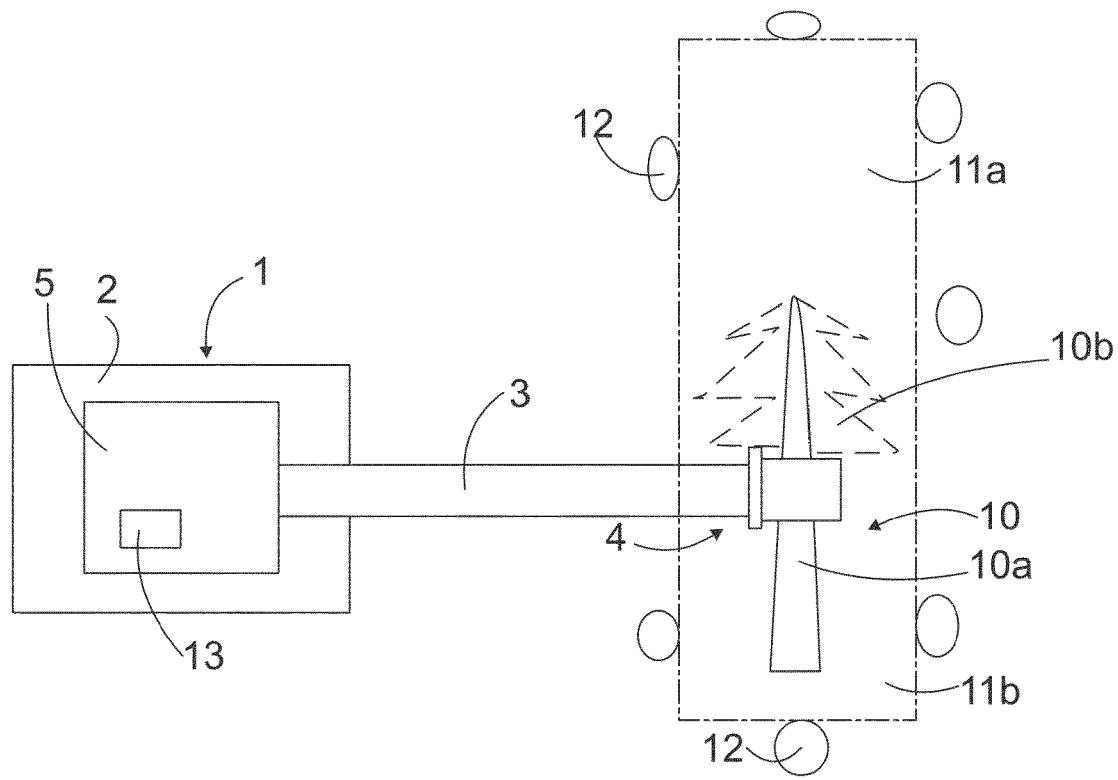
FIG. 5 shows the arrangement of FIG. 4 in the middle of pruning.
Figure 6:
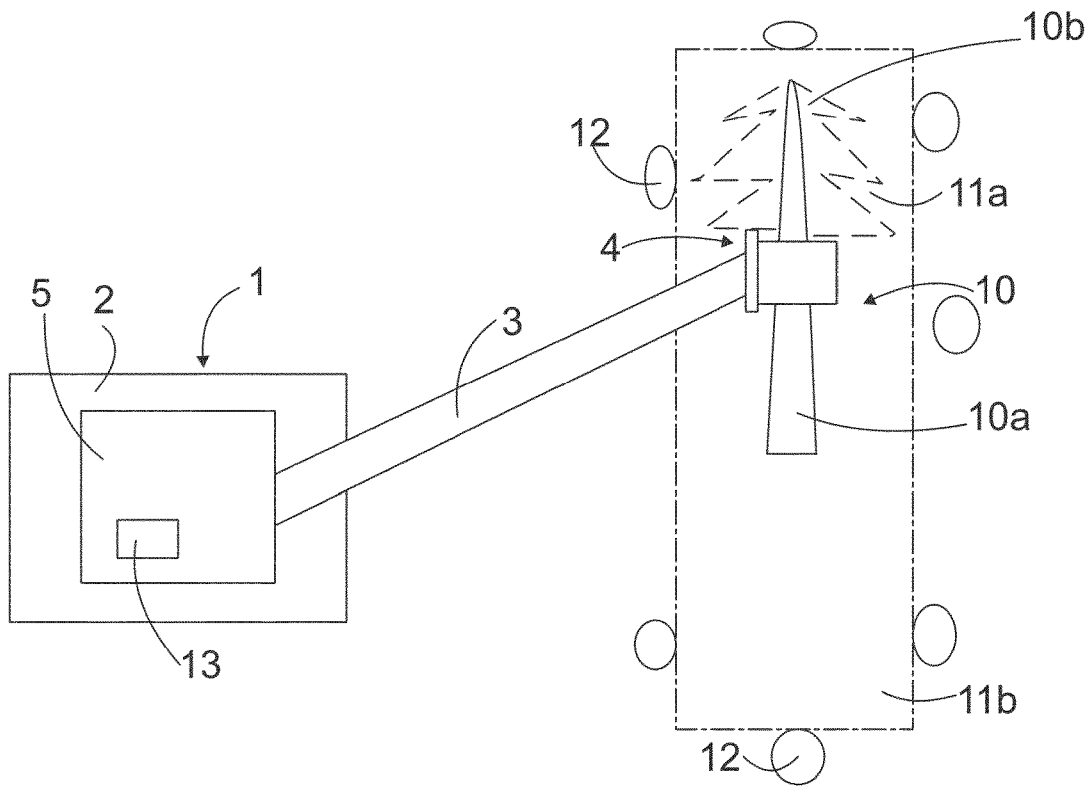
FIG. 6 shows the arrangement of FIG. 5 after moving the tree.

In the situation of FIG. 5, it is possible to increase the size of the utilisable free space e.g. by moving the end of the boom 3, whereby ending up in the situation shown in FIG. 6.

Figure 7:
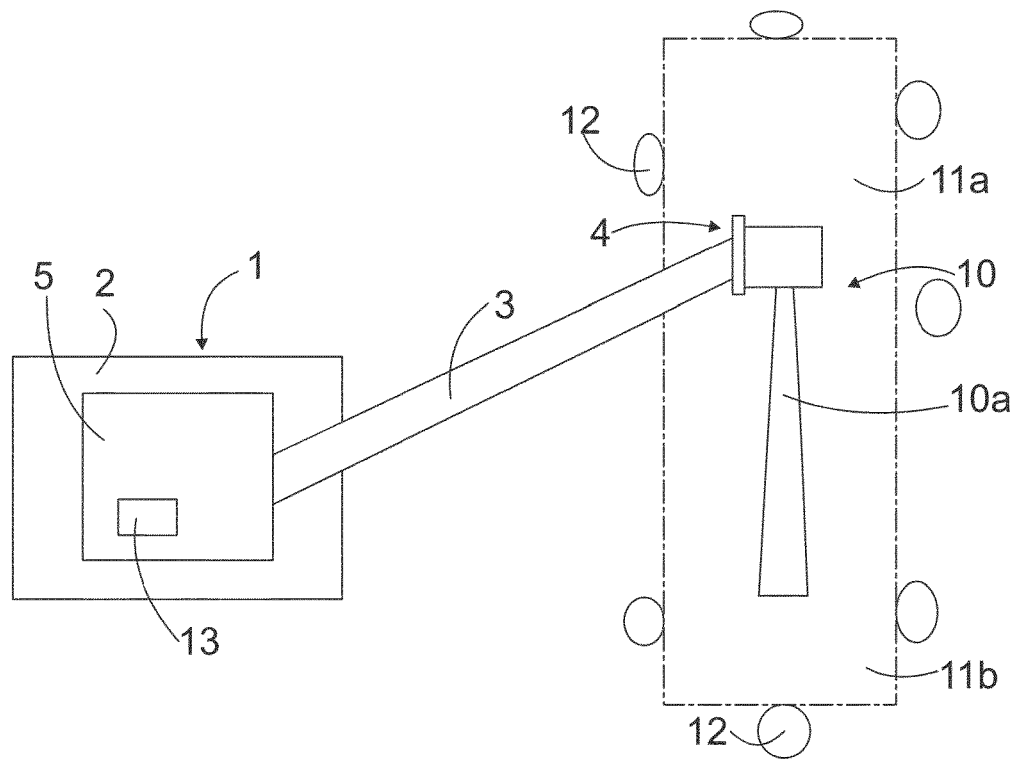
FIG. 7 shows the arrangement of FIG. 6 at the end of pruning.

After this, the harvester head is allowed to continue its operation such that the tree 10 is pruned by feeding the trunk 10*a* into the direction of the increased utilisable free space 11*b*. The feeding can be continued for the length of the utilisable free space. If the length is sufficient for the maximum requirement, the trunk 10*a* can be cut in this step to a desired length which is illustrated in FIG. 7.

Figure 4:
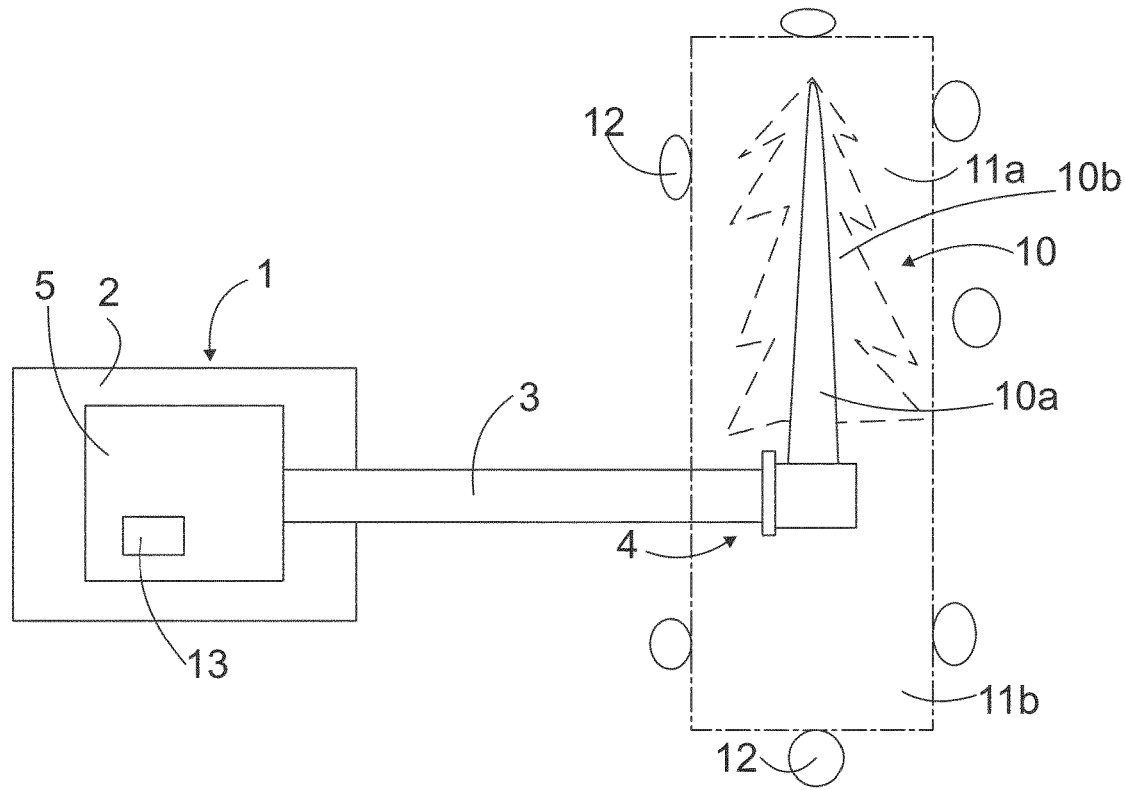
FIG. 4 shows the arrangement of FIG. 3 after felling.

If the length of the utilisable free space 11*a* in direction A were great, it would be possible even in the situation shown by FIG. 4 to increase the length of the utilisable free space 11*b* in direction B by moving the end of the boom 3 into direction A. It is still preferable to first do some pruning by utilising the free space 11*b* in direction B, because then the tree 10 at the end of the boom 3 sets more balancedly in the harvester head in a way illustrated by FIG. 5.

Instead of or in addition to increasing the length of the utilisable free space by moving the end of the boom 3, the length can be increased by moving or removing an object or objects 12 preventing the operation. A fixed object 12 can be removed or moved if it is lightweight enough or otherwise easily maneuverable. A moving object 12 can be guided (a vehicle) or chased off (an animal) or otherwise transferred.

The size of the utilisable free space can be updated such that, when the distance between the end of the boom 3 and the object 12 preventing the operation decreases, the size of the utilisable free space is decreased and, as the distance between the end of the boom 3 and the object 12 preventing the operation increases, the size of the utilisable free space is increased. This is how it is possible to operate in a flexible way and effectively utilise the available free space as much as possible at the given moment. The need for updating can thus be caused by the moving of the end of the boom 3 and/or the moving, transferring or removing of the object 12 preventing operation.

The data of the sensor 9 or other sensor arrangement can be combined in a control unit 13 of the forest machine 1. The control unit 13 can have been arranged to control the forest machine 1 to implement the above-described operations.

The control unit 13 can have been arranged to receive control requests from the control system of the forest machine 1. The control unit 13 can receive e.g. a control request for the tool 4 to operate. The control unit 13 can verify if the tool 4 has space to operate, i.e. if there is utilisable free space into the direction and for the length that the control request of the tool 4 expresses. If there is free space for the tool 4 into the desired direction and for the desired length, the control unit 13 can be arranged to allow the operation of the tool 4 into the direction and for the length of the predetermined utilisable free space. If there is no free space, the control unit 13 can be arranged to give a notification or a warning to the operator of the forest machine. Then, the operator of the forest machine can enter a command to override the prevention of operation to the control unit 13 via the control system, after which, the control unit 13 can have been arranged to allow the operation of the tool.

In an embodiment, the control unit 13 can be arranged to determine the minimum requirement of free space required for the operation of the tool 4 from the end of the boom 3. As a response to the dimensions of the utilisable free space being at least equal to the minimum requirement, the control unit 13 can be arranged to allow the operation of the tool 4 for the minimum requirement.

In an embodiment, the control unit 13 can also have been arranged to determine the maximum requirement of free space required for the operation of the tool 4 from the end of the boom 3. If the size of the utilisable free space is below the maximum requirement, the control unit can still be arranged to allow the operation of the tool 4, but then at most into the direction and for the length of the utilisable free space. The control unit 13 can then or simultaneously be further arranged to increase the size of the utilisable free space e.g. by controlling the moving of the end of the boom 3.

In an embodiment, the control unit 13 can be arranged to update the size of the utilisable free space such that, when the distance between the end of the boom 3 and the object 12 preventing the operation decreases, the control unit 13 is arranged to decrease the size of the utilisable free space and, when the distance between the end of the boom 3 and the object 12 preventing the operation increases, the control unit 13 is arranged to increase the size of the utilisable free space.

The fact that the control unit 13 is arranged to allow the operation of the tool 4 means that the control unit 13 sends control commands to the tool 4 to operate in accordance with the control request. The control unit 13 not allowing the operation of the tool 4 means that the control unit 13 does not send control commands in order for the tool 4 to operate. Instead, the control unit can be arranged to give a notification to the operator of the forest machine 1 on the size of the utilisable free space not being enough for performing the desired operation. The control unit 13 can be arranged at the same time to ask the operator if the operator wishes that the operation is performed despite of this, that is, that the prevention of the operation is overridden.

Figure 8:
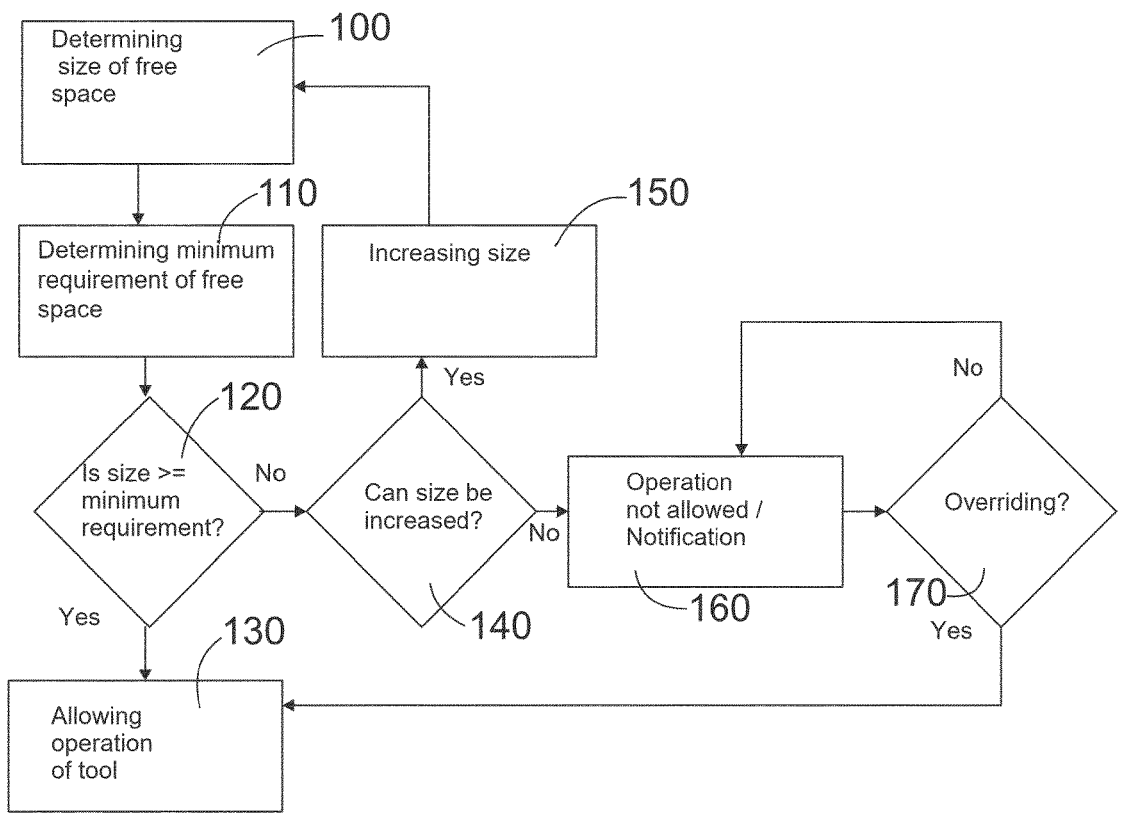
FIG. 8 shows a block diagram of a control method of a forest machine.

FIG. 8 shows a method in the control of a forest machine. First, the size of utilisable free space is determined in block 100. Block 110 determines a minimum requirement of free space required. Block 120 checks if the size of utilisable free space at least equals the determined minimum requirement of free space required. If the size of the utilisable free space is greater than the determined minimum requirement of free space required, the operation of the tool 4 is allowed based on block 130 for at least the minimum requirement.

If the size of the utilisable free space is smaller than the determined minimum requirement of free space required, block 140 checks if the size of the utilisable free space can be increased. If the size of the utilisable free space can be increased, it is increased based on block 150. Then, we return to block 100 and if the size of the utilisable free space is now greater, based on the checks in blocks 110 and 120, than the determined minimum requirement of free space required, the operation of the tool 4 is allowed based on block 130 for at least the minimum requirement.

If it is found out in block 140 that the size of the utilisable free space cannot be increased, the operation of the tool 4 is not allowed and/or a notification is given to the operator of the forest machine based on block 160. After this, block 170 checks if the prevention of operation is wished to override. If there is wish to override the prevention of operation, the operation of the tool 4 is allowed based on block 130 at least for the minimum requirement.

Figure 9:
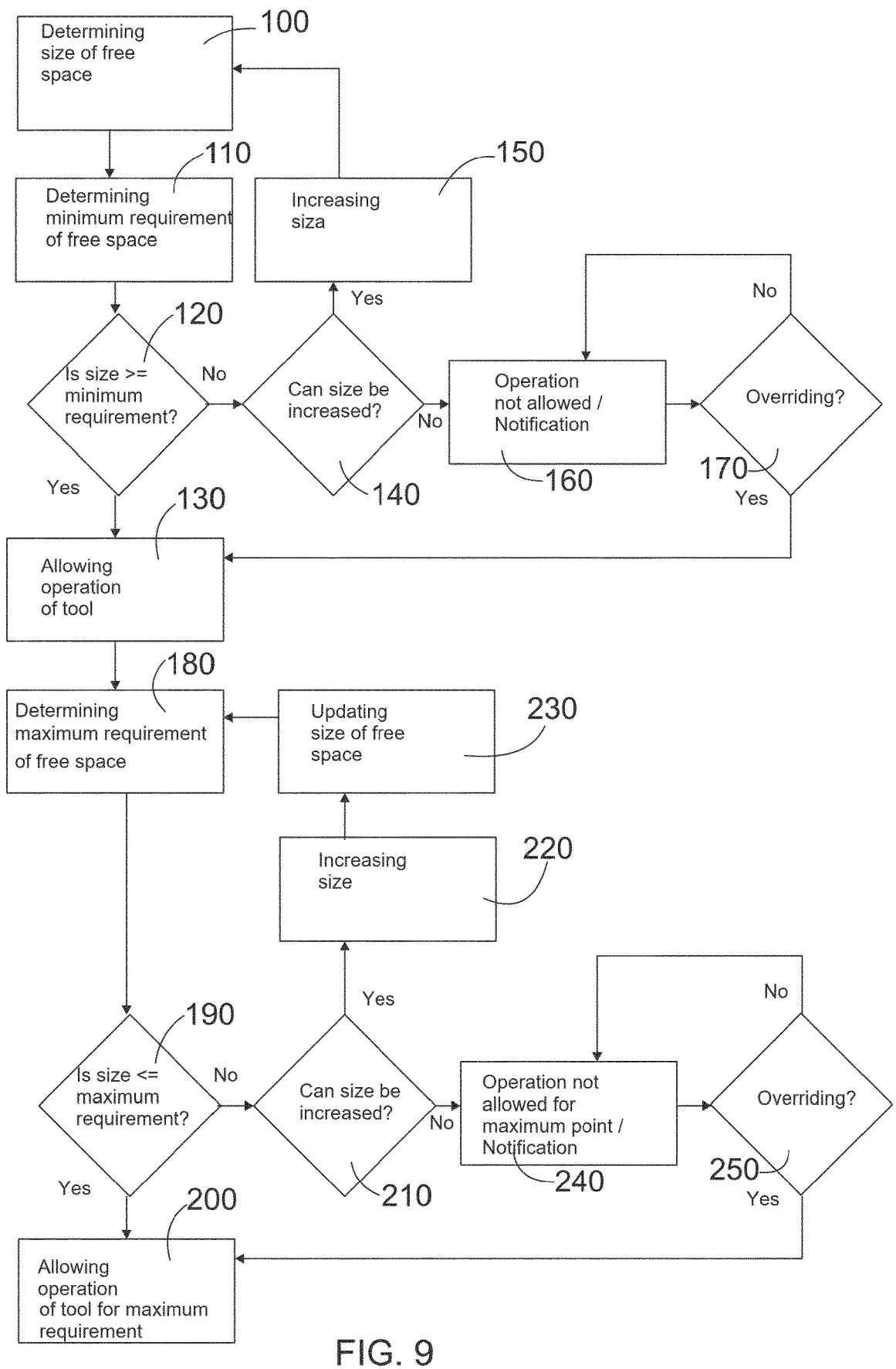
FIG. 9 shows a block diagram of another control method of a forest machine.

In an embodiment shown in FIG. 9, the operation in blocks 100-170 corresponds the operation shown in FIG. 8. In addition, block 180 determines the maximum requirement of free space required from the end of the boom 3 for the operation of the tool 4. Block 190 checks if the size of the utilisable free space at least equals the maximum requirement and, if it is true, the operation of the tool 4 is allowed based on block 200 for the maximum requirement. However, it should be noted that even though the size of the utilisable free space is below the maximum requirement, the operation of the tool 4 will still be allowed at least for the minimum requirement based on block 130, if the conditions for the operation set in block 130 are fulfilled.

If the size of the utilisable free space is below the maximum requirement, block 210 checks if the size of the utilisable free space can be increased. If the size of the utilisable free space can be increased, it will be increased based on block 220. Then, the size of utilisable free space is updated in block 230. If the size of the utilisable free space at least equals the maximum requirement based on the checks of blocks 180 and 190, the operation of the tool 4 is allowed based on block 200 for the maximum requirement.

If it is found out in block 210 that the size of the utilisable free space cannot be increased, the operation of the tool 4 is not allowed and/or a notification of it is given to the operator of the forest machine based on block 240. After this, block 250 checks if the prevention of operation is wished to override. If the prevention of operation is wished to override, the operation of the tool 4 is allowed based on block 200 for the maximum requirement. It should be repeated that even though the operation of the tool 4 were not allowed for the maximum requirement, the operation of the tool 4 can be allowed for at least the minimum requirement, the conditions of the operation in question being fulfilled.

A computer program product in the control unit 13 comprises computer-readable program code which is arranged to implement the operations of the disclosed forest machine or the steps of the method which carries out the functions as the program code is being run by a processor. The control unit 13 comprises processing means or a processor. The control unit 13 can comprise memory in which information has been collected and stored as well as is being collected and stored. The processing means can be arranged to carry out at least part of the process steps and/or operations disclosed in this specification. In an embodiment, the processing means may be adapted to receive and send information and commands. The processing means can comprise e.g. a programmable logic and/or a programmable microprocessor. The processing means can form the control unit 13 or a part thereof.

An embodiment comprises a computer program comprising program code which, when executed on a computer, executes operations according to any of the embodiments described above. The computer program may be included in a computer-readable storage medium, for instance in a non-volatile memory.

An embodiment comprises a computer program product comprising a computer program according to an embodiment for executing functions according to any of the embodiments described above.

In an embodiment, the apparatus comprises processing means configured to execute functions described in an embodiment. The processing means may serve as a computer for executing the program code. The processing means may comprise at least one processor, memory and program platform capable of executing the program code.

The embodiments can be implemented as a computer process that is defined by a computer program. The computer program may be in source code format, object code format or an intermediate format, and the computer program can be stored on a storage medium that may be any piece or apparatus that is capable of storing the computer program. For instance, a computer program can be stored on a computer program distribution medium that can be read by a computer or processor. The computer program distribution medium may comprise a storage medium, computer memory, read-only memory (ROM), electric carrier wave, telecommunications signal, and software distribution package, for instance.

In an embodiment, a computer program product may be stored on a computer-readable media and executable by a processor, and the computer program product may comprise computer-readable program code. This type of a computer program product can be arranged to execute at least some of the steps in the method described above, when the program code is run by a processor.

In an embodiment, the forestry machine 1 comprises any of the control arrangements disclosed in this description and/or figures.

Those skilled in the art will find it obvious that, as technology advances, the basic idea of the invention can be implemented in many different ways. The invention and its embodiments are thus not restricted to the examples described above but may vary within the scope of the claims.

The invention claimed is:

1. A method of controlling a forest machine, the forest machine including a body, a boom in connection with the body, and a tool at the end of the boom, the method comprising:
   determining by a sensor arrangement in advance the size of utilizable free space starting from the end of the boom, the determination comprising determining a direction and a length of the free space, and
   operating the tool into the direction and within the length of the utilizable free space determined in advance.

2. The method according to claim 1, further comprising determining a minimum requirement from the end of the boom for the operation of the tool and, as a response to the size of the utilizable free space being at least equal to the minimum requirement, allowing the operation of the tool for the minimum requirement.

3. The method according to claim 2, further comprising determining a maximum requirement from the end of the boom for the operation of the tool and, as a response to the size of the utilizable free space being smaller than the maximum requirement, allowing the operation of the tool at most into the direction and for the length of the utilizable free space, increasing the size of the utilizable free space and allowing the operation of the tool into the direction and for the length of the increased utilizable free space.

4. The method according to claim 3, wherein the size of the utilizable free space is increased by moving the end of the boom.

5. The method according to claim 1, further comprising updating the size of the utilizable free space such that, when the distance between the boom end and an object preventing the operation decreases, the size of the utilizable free space is decreased and, when the distance between the boom end and the object preventing the operation increases, the size of the utilizable free space is increased.

6. The method according to claim 1, wherein the operation of the tool comprises one or more of the following: cutting and felling a tree, pruning a tree, feeding a tree in the longitudinal direction in the tool, or moving the tool by moving the end of the boom.

7. The method according to claim 1, wherein the sensor arrangement includes a sensor configured to determine the utilizable free space.

8. The method according to claim 1, wherein the tool is operated in response to a control request from an operator.

9. The method according to claim 1, further comprising preventing a control command from being sent in response to a determination that insufficient utilizable free space is available to perform a desired operation with the tool.

10. The method according to claim 9, further comprising sending an alert to an operator in response to the determination that insufficient utilizable free space is available to perform the desired operation with the tool.

11. The method according to claim 10, further comprising causing the control command to be sent, despite the determination that insufficient utilizable free space is available to perform the desired operation with the tool, in response to an override command being received from the operator.

12. A control arrangement configured for use in a forestry machine, the forestry machine comprising a body, a boom in connection with the body, and a tool at the end of the boom, the arrangement comprising:
   a sensor arrangement configured to determine in advance the size of utilizable free space from the end of the boom, therein the determination comprises determining a direction and a length of the free space, and
   a controller configured, as a response to a control request for the operation of the tool, to operate the tool into the direction and within the length of the utilizable free space determined in advance.

13. The control arrangement according to claim 12, wherein the controller is further configured to determine a minimum requirement from the end of the boom for the operation of the tool and, as a response to the size of the utilizable free space being at least equal to the minimum requirement, to allow the operation of the tool for the minimum requirement.

14. The control arrangement according to claim 13, wherein the controller is further configured to determine a maximum requirement from the end of the boom for the operation of the tool and, as a response to the size of the utilizable free space being smaller than the maximum requirement, to allow the operation of the tool at most into the direction and for the length of the utilizable free space, and further to control the moving of the end of the boom in order to increase the size of the utilizable free space.

15. The control arrangement according to claim 12, wherein the controller is further configured to update the size of the utilizable free space such that, when the distance between the end of the boom and an object preventing the operation decreases, the controller is further configured to decrease the size of the utilizable free space and, when the distance between the end of the boom and the object preventing the operation increases, the controller is further configured to increase the size of the utilizable free space.

16. The control arrangement according to claim 12, wherein the sensor arrangement includes a sensor configured to the utilizable free space.

17. The control arrangement according to claim 12, wherein the controller is further configured to prevent a control command from being sent in response to a determination that insufficient utilizable free space is available to perform a desired operation with the tool.

18. The control arrangement according to claim 17, wherein the controller is further configured to cause the control command to be sent, despite the determination that insufficient utilizable free space is available to perform the desired operation with the tool, in response to an override command being received from the operator following the operator having received an alert.

19. A forestry machine, comprising;
   a body, a boom in connection with the body, a tool at the end of the boom, and a control arrangement, wherein the control arrangement includes:
   a sensor arrangement configured to determine in advance the size of utilizable free space from the end of the boom, therein the determination comprises determining a direction and a length of the free space, and
   a controller configured, as a response to a control request for the operation of the tool, operate the tool into the direction and within the length of the utilizable free space determined in advance.

20. A non-transitory computer-readable storage medium comprising computer-readable program code that, when executed, is configured to perform operations comprising:
   determining by a sensor arrangement in advance the size of utilizable free space starting from the end of the boom, the determination comprising determining a direction and a length of the free space, and
   operating the tool into the direction and within the length of the utilizable free space determined in advance.

* * * * *